UNITED STATES PATENT OFFICE.

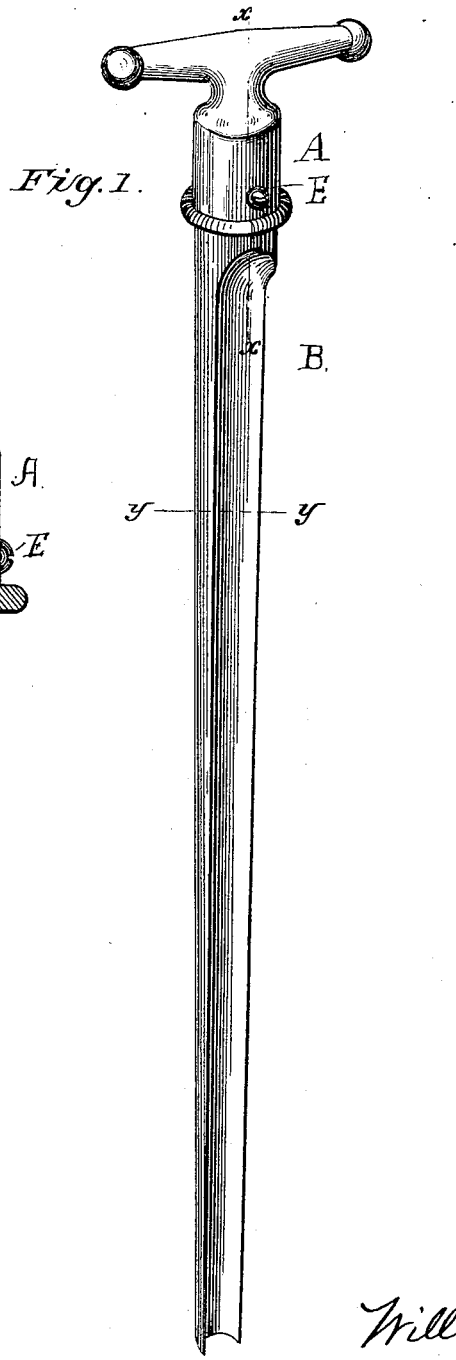

WILLIAM C. LAYER, OF MILWAUKEE, ASSIGNOR OF ONE-HALF TO FRANK J. HOLLIS, OF BELOIT, WISCONSIN.

TRIER.

SPECIFICATION forming part of Letters Patent No. 368,344, dated August 16, 1887.

Application filed January 15, 1887. Serial No. 224,426. (Model.)

*To all whom it may concern:*

Be it known that I, WILLIAM C. LAYER, a citizen of the United States, residing at Milwaukee, in the county of Milwaukee and State of Wisconsin, have invented certain new and useful Improvements in Triers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention is a butter, cheese, lard, tallow, &c., trier, for the purpose of taking samples out of large or bulky quantities.

The objects of my invention are to provide a trier that will not rust, corrode, nor injure the material to be examined; that will be strong, cheap, and durable, and adapted for use upon different materials. Blades of different sizes can be used in the handle, and, in case of breaking, be easily renewed. It is obvious that trier-blades of different lengths and of somewhat different contour might be used in this handle, and so serve for trying or testing many different materials. I attain these objects by the construction illustrated in the accompanying drawings, in which—

Figure 1 is a perspective view of the entire trier, showing the metallic handle A, wooden blade B, and screw E, to fasten the blade in the handle. I do not desire to limit myself to any particular means for securing the blade to the handle, for it is obvious that other well-known devices for securing blades to handles might be substituted for the device shown; but I prefer the construction shown, as it is simple. Fig. 2 is a vertical section of the same on the line $xx$ of Fig. 1. Fig. 3 is a horizontal section of the same on the line $yy$ of Fig. 1.

A is the T-shaped handle, made of metal and having a reduced socket stem or extension, $a$, to receive the end $b$ of the tapering blade B. The blade, made of wood, is of concavo-convex form and tapering from end or shank $b$ to the tip, which is gouge-shaped and pointed.

The handle is preferably one entire piece, and is T-shaped to combine strength, simplicity, and convenience for forcing the blade into the material to be examined, and it can be turned with one or both hands, and is preferably silver-plated to prevent it from rusting.

The arms of the handle are about three inches long and one inch in diameter, being slightly necked. The stem of the handle is preferably cylindrical and about one and one-half inch in diameter, having a socket about three inches deep to receive the shank of the blade. The handle is detachable from the blade, so that in case the blade breaks or becomes porous, and thus retains tainted material, or becomes tainted, it may be removed by taking out the screw E, and a new one substituted.

The trier is operated by sticking it into the material to be examined and turning it half around and drawing it out. It takes out in its concave side a sample of the bulk material of its full length.

I am aware that T-shaped handles have been applied to all sorts of tools; that blades of triers have been removably attached to their handles; that the blades of triers have been made tapering and concavo-convex, and I do not claim those features separately.

What I claim as my invention, and desire to secure by Letters Patent, is—

The butter-trier described, consisting of the tapering concavo-convex blade of wood having the reduced shank, and the removable metallic T-shaped handle provided with a socket fitting over the shank of the blade, the two parts being secured together, as set forth.

In testimony whereof I affix my signature in presence of two witnesses.

WILLIAM C. LAYER.

Witnesses:
 JNO. T. RUKA,
 N. E. BIRCHARD.